United States Patent
Kriz, II

(10) Patent No.: US 9,393,942 B2
(45) Date of Patent: Jul. 19, 2016

(54) COMPOSITE SPRING RETAINER AND METHOD OF ASSEMBLY IN A BRAKE MASTER CYLINDER

(71) Applicant: Richard James Kriz, II, Moraine, OH (US)

(72) Inventor: Richard James Kriz, II, Moraine, OH (US)

(73) Assignee: BeijingWest Industries, Co., Ltd., Beijing (CN)

( * ) Notice: Subject to any disclaimer, the term of this patent is extended or adjusted under 35 U.S.C. 154(b) by 345 days.

(21) Appl. No.: 14/184,747

(22) Filed: Feb. 20, 2014

(65) Prior Publication Data
US 2015/0121861 A1 May 7, 2015

Related U.S. Application Data

(60) Provisional application No. 61/898,599, filed on Nov. 1, 2013.

(51) Int. Cl.
*F15B 7/08* (2006.01)
*B60T 11/16* (2006.01)

(52) U.S. Cl.
CPC . *B60T 11/16* (2013.01); *F15B 7/08* (2013.01); *Y10T 29/49236* (2015.01); *Y10T 29/53613* (2015.01)

(58) Field of Classification Search
CPC ............ F15B 7/08; B60T 11/16; B60T 11/20
See application file for complete search history.

(56) References Cited

U.S. PATENT DOCUMENTS

| 6,012,288 | A | 1/2000 | Gualdoni et al. |
| 6,311,492 | B1 | 11/2001 | Takayama et al. |
| 6,519,940 | B2 | 2/2003 | Lange et al. |
| 7,168,536 | B2 | 1/2007 | Feigel |
| 7,937,940 | B2 | 5/2011 | Gaffe et al. |
| 8,360,532 | B2 | 1/2013 | Nishino et al. |
| 2007/0028614 | A1 | 2/2007 | Hoffmann et al. |
| 2008/0289329 | A1 | 11/2008 | Gaffe et al. |
| 2009/0241768 | A1 | 10/2009 | Ogiwara et al. |
| 2012/0204552 | A1 | 8/2012 | Takahashi |

FOREIGN PATENT DOCUMENTS

| CN | 201300831 | 9/2009 |
| CN | 201800705 | 4/2011 |
| EP | 0651867 B1 | 2/1994 |
| EP | 1686028 A2 | 8/2006 |
| KR | 1020100084770 | 7/2010 |
| WO | 2012171211 A1 | 12/2012 |

*Primary Examiner* — Michael Leslie
(74) *Attorney, Agent, or Firm* — Dickinson Wright PLLC

(57) ABSTRACT

A cup shaped spring retainer is slidably disposed within a cup shaped piston, encapsulating a spring therebetween. The side wall of the spring retainer presents a plurality of recesses and a plurality of slots defining a plurality of fingers. A tang, projects radially outward at the distal end of each of the fingers to engage a retaining ring within the piston in a latch position. The combination of the spring retainer and the piston provide an arrangement whereby all of the fingers may be compressed with the spring retainer outside of the piston to an insert position with the tangs disposed in gripping engagement with the spring. After inserting the compressed spring retainer into the piston, the radial compression the of the fingers may be released to allow the fingers to expand from the insert position to the latch position at which point the deflection of the fingers is discontinued.

18 Claims, 4 Drawing Sheets

US 9,393,942 B2

COMPOSITE SPRING RETAINER AND METHOD OF ASSEMBLY IN A BRAKE MASTER CYLINDER

RELATED APPLICATIONS

This application claims the benefit of U.S. Provisional Application No. 61/898,599 filed on Nov. 1, 2013.

BACKGROUND OF THE INVENTION

1. Field of the Invention

The subject invention relates to a master cylinder of a hydraulic brake system of a vehicle.

2. Description of the Prior Art

Master brake cylinder apparatuses are known in the prior art. One such apparatus is disclosed in Chinese Patent Application CN201300831Y by Zhong et al.

The Zhong et al. application discloses a master brake cylinder apparatus including a piston having a cup shape with a tubular wall extending about an axis between a mouth end and a seat. The piston has a retaining ring projecting radially inward from the tubular wall to define a first catch shoulder facing the seat, with the retaining ring presenting a first ramp extending radially upward and inward from the tubular wall toward the axis and axially away from the mouth end of the piston, and the retaining ring presenting an inner wall extending from the first ramp in an axial direction and terminating at the first catch shoulder.

The Zhong et al. application also discloses a spring retainer having a cup shape with a side wall extending axially from a base to a distal end and defining a plurality of slots to present a plurality of fingers between the slots. The spring retainer includes a tang projecting radially outward at the distal end of each of the fingers to define a second ramp connected by an axially extending peripheral wall to a second catch shoulder. Each of the slots are defined by two edges extending from the distal end to a bottom end having a semi-circular shape and defining a lowermost point.

SUMMARY OF THE INVENTION

The invention provides such a cup-shaped spring retainer having a side wall with an outer surface presenting a plurality of recesses spaced at regular intervals circumferentially and extending axially along the height of the side wall.

The subject invention also provides a method of assembling a spring and a spring retainer into a cup shaped piston of a master cylinder for a brake system. The method comprises the steps of deflecting the fingers radially inward to the insert position with the tangs disposed in gripping engagement with the spring by simultaneously applying a radial force with a tool to all of the fingers along the third length, maintaining each tang of the fingers deflected into the gripping engagement with the spring to the release position, then reducing the deflection of the fingers to allow the fingers to move radially outward, and finally discontinuing the application of the radial force to the fingers when the side walls thereof engage the inner wall of the retaining ring in the latch position.

ADVANTAGES OF THE INVENTION

The invention in its broadest aspect provides for a spring retainer device having recesses which provide structural rigidity to allow longer slots than those in the prior art.

Another advantage of the invention is that the recesses in the side wall allow the parting line from the molding process to be located within the recesses and away from the rubbing surfaces, reducing the amount of debris generated.

The subject assembly method allows a gradual release of the deflection of the fingers during assembly to prevent the debris generated by the snap-in motion of the prior art.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 3:
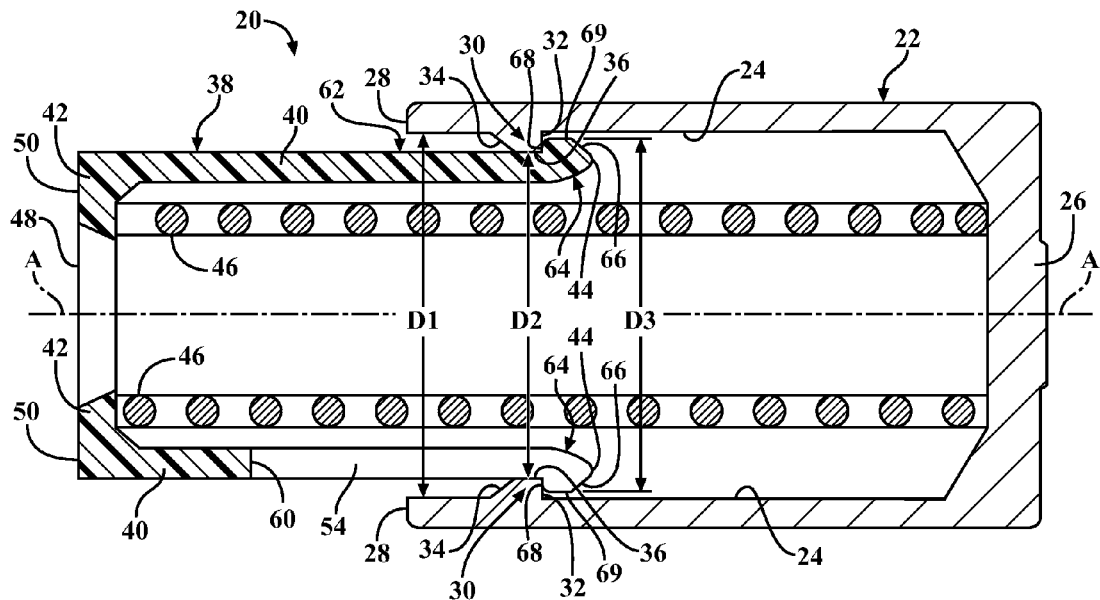
FIG. 3 is a cross sectional view of the apparatus of the subject invention.
Figure 4:
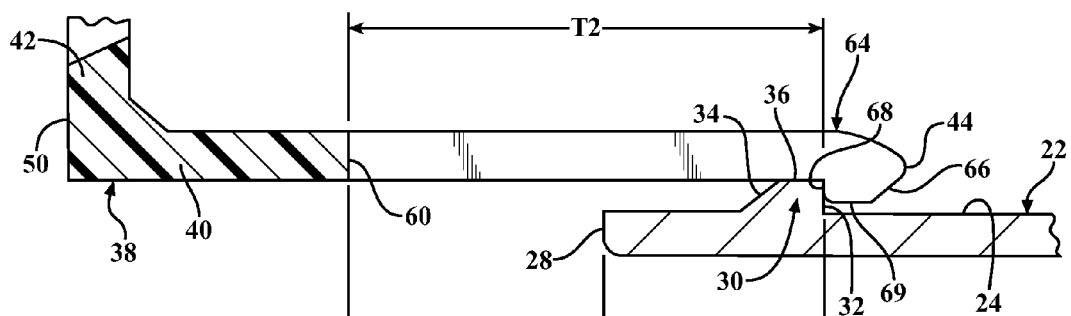
FIG. 4 is a fragmentary view of the cross sectional view of FIG. 3.

Referring to the Figures, wherein like numerals indicate corresponding parts throughout the several views, an apparatus 20 for installation in a brake master cylinder is generally shown and described in cross section in FIGS. 3 and 4.

The apparatus 20 includes a piston 22, generally indicated in FIGS. 3 and 4, having a cup shape with a tubular wall 24 extending annularly about an axis A between a seat 26 and a mouth end 28 having a first diameter D1. The piston 22 features a retaining ring 30, generally indicated, that projects radially inward from the tubular wall 24 to define a first catch shoulder 32 spaced from the mouth end 28 a first length T1 and facing the seat 26. The retaining ring 30 presents a first ramp 34 extending radially upward and inward from the tubular wall 24 toward the axis A and axially away from the mouth end 28 of the piston 22. The retaining ring 30 also presents an inner wall 36 defining a second diameter D2 extending from the first ramp 34 in an axial direction and terminating at the first catch shoulder 32. All elements of the retaining ring 30 extend annularly about the axis A.

The apparatus 20 also includes a spring retainer 38, generally indicated in FIGS. 1-8, having a cup shape with a side wall 40 extending axially from a base 42 to a distal end 44 as shown in FIGS. 1-4. As shown in FIG. 3, the spring retainer 38 is slidably disposed in the piston 22 to encapsulate a spring 46 which extends between the base 42 of the spring retainer 38 and the seat 26 of the piston 22. The seat 26 of the piston 22 has a flat circular surface for engaging the spring 46, surrounded by a frustoconical surface to center the spring 46 on the axis A. The base 42 of the spring retainer 38 has an axially centered aperture 48 and a terminal surface 50 defining a plurality of troughs 52 extending radially from the aperture 48 to the side wall 40. The side wall 40 of the spring retainer 38 defines a plurality of slots 54, each having two edges 56 extending from the distal end 44 to a bottom end 58 having a semi-circular shape and defining a lowermost point 60. The slots 54 taper from a maximum circumferential width at the distal end 44 to a minimum circumferential width at the bottom end 58 to prevent adjacent slots 54 from contacting one another during the assembly process and to prevent debris that can be generated by such contact.

Figure 1:
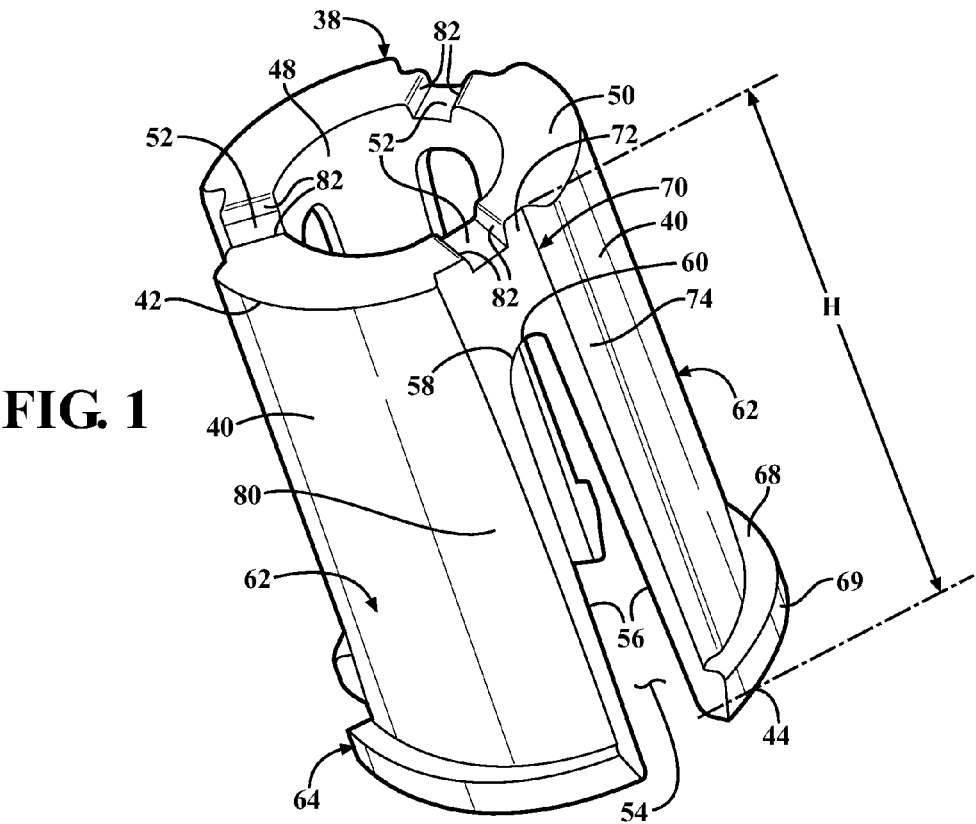
FIG. 1 is a perspective view of the preferred embodiment of a spring retainer of the subject invention.
Figure 2:
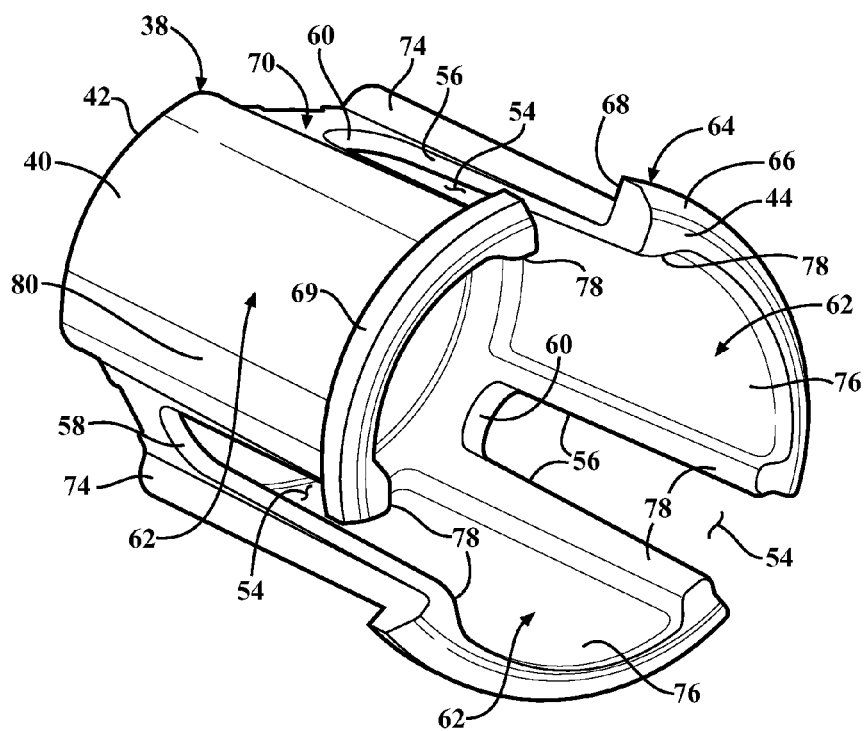
FIG. 2 is a perspective view of the preferred embodiment of a spring retainer of the subject invention.

A plurality of fingers 62, generally indicated in FIGS. 1-3, are defined by the side wall 40 between the slots 54. A tang 64, generally indicated in FIGS. 1-4, projects radially outward at the distal end 44 of each of the fingers 62 to define a second ramp 66 and a second catch shoulder 68 connected by an axially extending peripheral wall 69 having a third diameter D3 and which is axially spaced a second length T2 from the lowermost point 60 of the bottom of the slots 54. The side wall 40 of the spring retainer 38 also includes a plurality of recesses 70, generally indicated in FIG. 1, spaced at regular intervals circumferentially and extending axially along the height H of the side wall 40. Each of the recesses 70 presents a floor 72 which is concentric between two bank walls 74, each extending radially inward from the side wall 40 to the floor 72. The bank walls 74 taper from a minimum depth at the distal end 44 of the spring retainer 38 to a maximum depth at the base 42.

Figure 5:
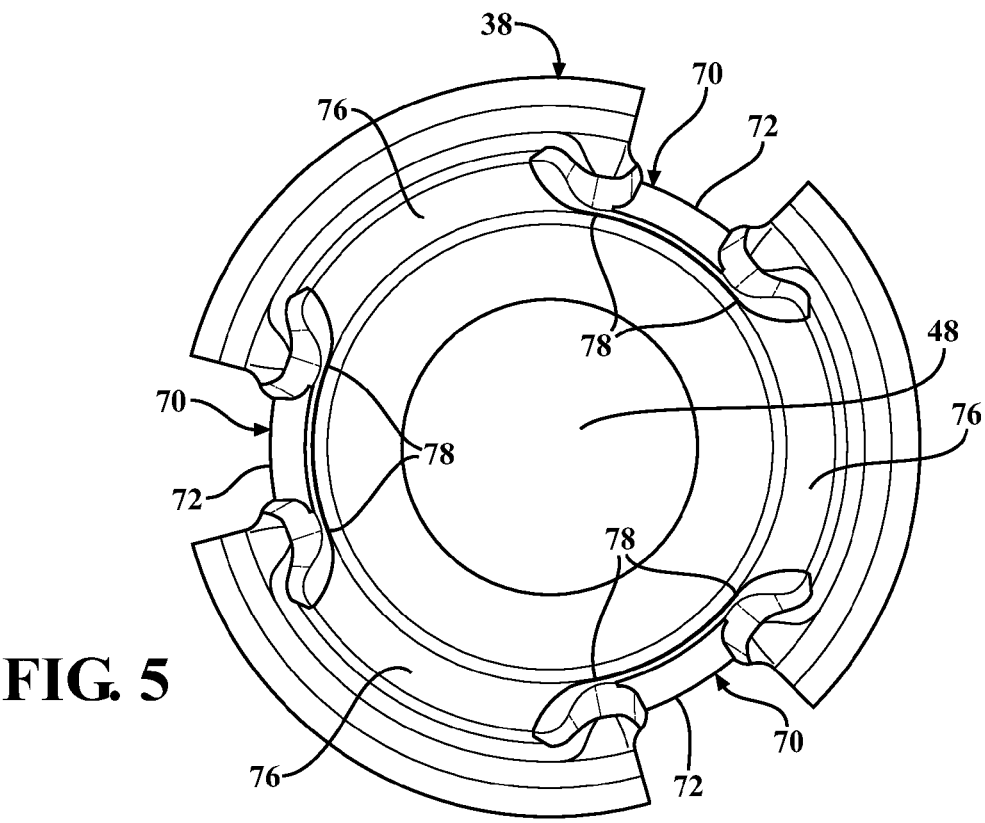
FIG. 5 is a bottom view of a spring retainer of the subject invention.

The side wall 40 of the spring retainer 38 tapers from a maximum diameter at the distal end 44 to a minimum diameter at the base 42. As shown in FIG. 5, the side wall 40 has an interior surface 76 with a plurality of internal guides 78 extending axially and in radial alignment with the recesses 70 on the outer surface 80. These internal guides 78 grip the spring 46 during installation and provide support against the spring 46 buckling.

As shown in FIG. 4, the second length T2 in the spring retainer 38 is longer than the first length Ti in the piston 22, and the difference between those lengths T1, T2 defines a third length T3.

Figure 6:
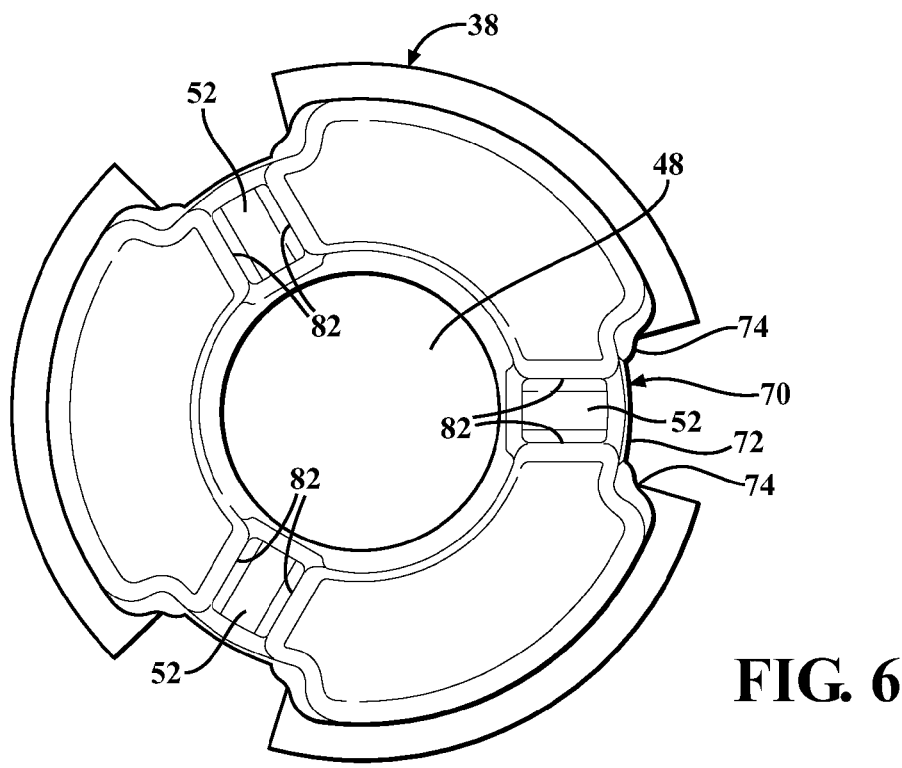
FIG. 6 is a top view of the preferred embodiment of a spring retainer of the subject invention.
Figure 7:
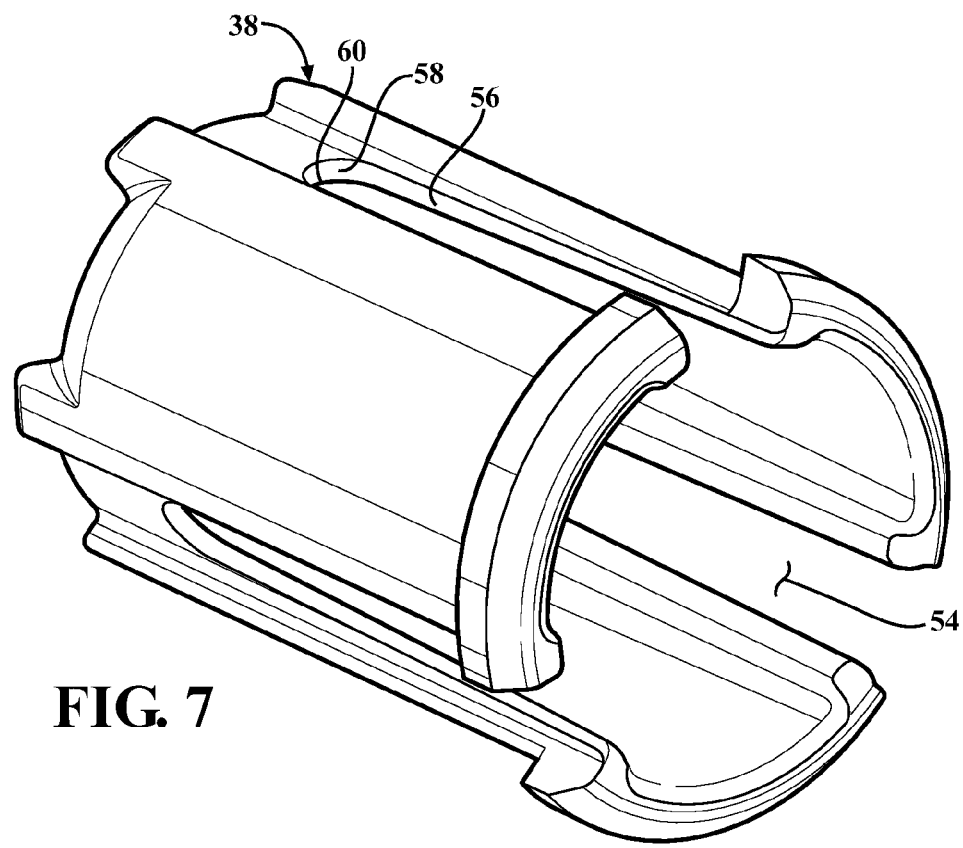
FIG. 7 is perspective view of an alternate embodiment of a spring retainer of the subject invention.
Figure 8:
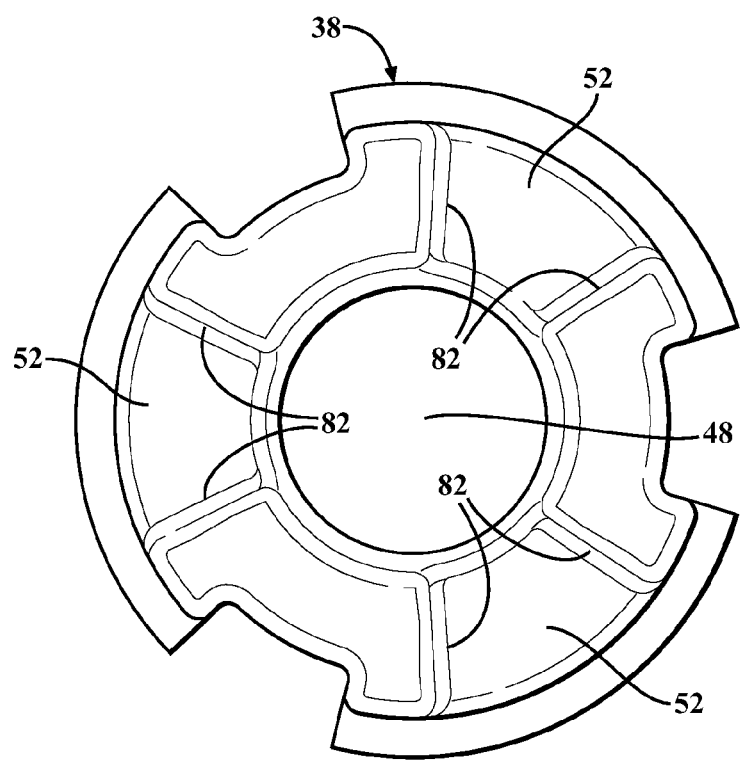
FIG. 8 is a top view of an alternate embodiment of a spring retainer of the subject invention.

In the preferred embodiment, as shown in FIGS. 1, and 6, the troughs 52 are generally wedge shaped and are defined by two radially oriented trough sides 82 and the troughs 52 are radially centered between the recesses 70. In an alternate embodiment, as shown in FIGS. 7, and 8, the troughs 52 are generally rectangular and are defined by two trough sides 82 in perpendicular alignment and the troughs 52 are radially aligned with the recesses 70.

In the event of a misalignment between the spring retainer 38 and the piston 22 or a failure to fully deflect the fingers 62 during installation, leaving the third diameter D3 larger than the second diameter D2, the second ramp 66 of the spring retainer 38 may axially align and radially overlap the first ramp 34 of the piston 22. This alignment will cause the ramps 34, 66 to slidably engage one another to deflect the fingers 62 radially inward in response to an axial insertion force, guiding the tangs 64 of the spring retainer 38 over the retaining ring 30 of the piston 22 into the release position with the second catch shoulder 68 of each tang 64 disposed axially between the first catch shoulder 32 of the retaining ring 30 and the seat 26 of the piston 22.

The subject invention also includes a method of assembling the spring 46 and spring retainer 38 into the piston 22 of a master cylinder for a brake system. The method includes the first step of applying a radial force with a tool to all of the fingers 62 along the third length T3 to deflect the fingers 62 radially inward, with the tangs 64 disposed within the second diameter D2 of the retaining ring 30 of the piston 22 and with the tangs 64 in gripping engagement with the spring 46. The next step of the method is to apply an axial force to compress the spring 46 between the base 42 of the spring retainer 38 and the seat 26 of the piston 22, inserting tangs 64 the spring retainer 38 axially through the retaining ring 30 of the piston 22 to a release position with the second catch shoulder 68 of each tang 64 disposed axially between the first catch shoulder 32 of the retaining ring 30 and the seat 26 of the piston 22 while maintaining each tang 64 of the fingers 62 deflected in gripping engagement with the spring 46. Upon axial insertion to the release position, the method continues by reducing the radial forced applied with the tool to reduce the deflection of the fingers 62 while maintaining the gripping engagement of the fingers 62 to allow the fingers 62 to move radially outward from the insert position, and discontinuing the application of the radial force to the fingers 62 when the side walls 40 engage the inner wall 36 of the retaining ring 30 in the latch position with the shoulders 32, 68, disposed in radial overlapping relationship with one another. The method concludes with the step of releasing the axial force to allow the spring 46 force to react between the seat 26 of the piston 22 and the base 42 of the spring retainer 38 to urge the second catch shoulder 68 axially into contact with the first catch shoulder 32 to retain the spring 46 and spring retainer 38 within the piston 22. The subject method of assembly reduces the amount of debris generated by the snap-in motion of the prior art.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An apparatus for installation in a brake master cylinder comprising;

a piston having a cup shape including a tubular wall extending about an axis between a mouth end having a first diameter and a seat, a retaining ring projecting radially inward from said tubular wall to define a first catch shoulder spaced from said mouth end a first length and facing said seat, said retaining ring presenting a first ramp extending radially upward and inward from said tubular wall toward said axis and axially away from said mouth end of said piston, said retaining ring presenting an inner wall defining a second diameter extending from said first ramp in an axial direction and terminating at said first catch shoulder, a spring retainer having a side wall extending axially from a base to a distal end and defining a plurality of slots to present a plurality of fingers between said slots, said spring retainer slidably disposed in said piston, a spring disposed in said spring retainer reacting with and extending between said base of said spring retainer and said seat of said piston, said slots each being defined by two edges extending from said distal end to a bottom end having a semi-circular shape and defining a lowermost point, a tang projecting radially outward at said distal end of each of said fingers to define a second ramp connected by an axially extending peripheral wall to a second catch shoulder having a third diameter and axially spaced a second length from said lowermost point of said slots, said shoulders being disposed in radial overlapping relationship with one another and said side wall of said spring retainer engaging said inner wall of said retaining ring in a latch position, said second length in said spring retainer being longer than said first length in said piston by a third length, and said side wall having a height and an outer surface presenting a plurality of recesses spaced at regular intervals circumferentially and extending axially along said height of said side wall.

2. An apparatus as set forth in claim 1 further including each of said recesses presenting a floor being concentric between two bank walls which each extend radially inward from said side wall to said floor.

3. An apparatus as set forth in claim 2 further including said bank walls tapering from a minimum depth at said distal end to a maximum depth at said base.

4. An apparatus as set forth in claim 1 further including said side wall having an interior surface presenting a plurality of internal guides extending axially and in radial alignment with said recesses on said outer surface.

5. An apparatus as set forth in claim 1 further including said side wall of said spring retainer tapering from a maximum diameter at said distal end to a minimum diameter at said base.

6. An apparatus as set forth in claim 1 further including said slots tapering from a maximum circumferential width at said distal end to a minimum circumferential width at said bottom end.

7. An apparatus as set forth in claim 1 further including said base defining an aperture centered axially in said base.

8. An apparatus as set forth in claim 7 further including said base having a terminal surface defining a plurality of troughs extending radially from said aperture to said side wall.

9. An apparatus as set forth in claim 8 wherein said troughs are generally rectangular and are defined by two trough sides in perpendicular alignment.

10. An apparatus as set forth in claim 8 wherein said troughs are generally wedge shaped and are defined by two trough sides each being radially oriented.

11. An apparatus as set forth in claim 8 wherein said troughs are in radial alignment with said recesses.

12. An apparatus as set forth in claim 8 wherein said troughs are radially offset from said recesses and are radially centered between said recesses.

13. A composite spring retainer for installation in a brake master cylinder comprising;

said spring retainer having a side wall extending axially from a base to a distal end and defining a plurality of slots to present a plurality of fingers between said slots, said slots each being defined by two edges extending from said distal end to a bottom end having a semi-circular shape and defining a lowermost point, a tang projecting radially outward at said distal end of each of said fingers to define a second ramp connected by an axially extending peripheral wall to a second catch shoulder having a third diameter, said base defining an aperture centered axially in said base, said base having a terminal surface defining a plurality of troughs extending radially from said aperture to said side wall, and said side wall having a height and an outer surface presenting a plurality of recesses spaced at regular intervals circumferentially and extending axially along said height of said side wall, each of said recesses presenting a floor being concentric between two bank walls which each extend radially inward from said side wall to said floor, said bank walls tapering from a minimum depth at said distal end to a maximum depth at said base, said side wall having an interior surface presenting a plurality of internal guides extending axially and in radial alignment with said recesses on said outer surface for gripping a spring during installation and providing support against buckling of said spring, said side wall of said spring retainer tapering from a maximum diameter at said distal end to a minimum diameter at said base, said slots tapering from a maximum circumferential width at said distal end to a minimum circumferential width at said bottom end.

14. A device as set forth in claim 13 wherein said troughs are generally rectangular and are defined by two trough sides in perpendicular alignment.

15. A device as set forth in claim 13 wherein said troughs are generally wedge shaped and are defined by two trough sides each being radially oriented.

16. A device as set forth in claim 13 wherein said troughs are in radial alignment with said recesses.

17. A device as set forth in claim 13 wherein said troughs are radially offset from said recesses and are radially centered between said recesses.

18. A method of assembling a spring and a spring retainer into a cup shaped piston of a master cylinder for a brake system with the piston including a tubular wall extending axially between a mouth end having a first diameter and a seat with a retaining ring projecting radially inward from said tubular wall to an inner wall having a second diameter to define a first catch shoulder axially spaced from the mouth end a first length, and with the spring retainer having a side wall extending axially from a base to a distal end and defining a plurality of slots to present a plurality of fingers between the slots and a tang projecting radially outward at the distal end of each of said fingers to define a second catch shoulder having third diameter and axially spaced a second length axially from the bottom of the slots wherein the second length in the spring retainer is longer than the first length in the piston by a third length, said method comprising the steps of:

deflecting the fingers radially inward to an insert position with the tangs disposed within the first diameter of the mouth end of the piston, applying an axial force to overcome the spring force and insert the spring retainer axially into the second diameter of the retaining ring of the piston, compressing the spring between the base of the spring retainer and the seat of the piston, inserting the spring retainer axially to a release position with the second catch shoulder of each tang disposed axially between the first catch shoulder of the retaining ring and the seat of the piston, discontinuing the deflecting of the fingers and expanding the fingers radially outwardly from the insert position to a latch position with said shoulders being disposed in radial overlapping relationship with one another and with the side wall of the spring retainer engaging the inner wall of the retaining ring, releasing the axial force to allow the spring force to react between the seat of the piston and the base of the spring retainer to urge the second catch shoulder axially into contact with the first catch shoulder to retain the spring and spring retainer within the piston, the deflecting of the fingers is further defined as simultaneously applying a radial force with a tool to all of the fingers and deflecting the fingers radially inward along the third length to the insert position with the tangs disposed in gripping engagement with the spring, maintaining each tang of the fingers deflected into the gripping engagement with the spring to the release position, maintaining the gripping engagement of the fingers and reducing the deflection of the fingers to allow the fingers to move radially outward, and discontinuing the application of the radial force to the fingers when the side walls thereof engage the inner wall of the retaining ring in the latch position.

* * * * *